US008392170B2

(12) United States Patent
Knauss et al.

(10) Patent No.: US 8,392,170 B2
(45) Date of Patent: Mar. 5, 2013

(54) EMULATION SYSTEM AND METHOD FOR A NO LONGER AVAILABLE MICROCONTROLLER

(75) Inventors: Matthias Knauss, Schorndorf (DE); Udo Schulz, Vaihingen/Enz (DE); Heinrich Barth, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 884 days.

(21) Appl. No.: 12/506,611

(22) Filed: Jul. 21, 2009

(65) Prior Publication Data

US 2010/0023310 A1 Jan. 28, 2010

(30) Foreign Application Priority Data

Jul. 25, 2008 (DE) .................... 10 2008 040 721

(51) Int. Cl.
*G06F 9/455* (2006.01)
(52) U.S. Cl. ............................ 703/23; 703/26
(58) Field of Classification Search .............. 703/23, 703/27
See application file for complete search history.

(56) References Cited

U.S. PATENT DOCUMENTS

| 5,581,695 A * | 12/1996 | Knoke et al. ............... 714/28 |
| 6,182,242 B1 * | 1/2001 | Brogan et al. .............. 714/26 |
| 6,366,878 B1 * | 4/2002 | Grunert ..................... 703/28 |
| 6,564,179 B1 * | 5/2003 | Belhaj ....................... 703/26 |
| 8,069,428 B1 * | 11/2011 | Ogami et al. .............. 716/117 |
| 2003/0046446 A1 * | 3/2003 | Basler ........................ 709/321 |
| 2004/0243986 A1 * | 12/2004 | Nishiyama ................. 717/139 |
| 2006/0046819 A1 * | 3/2006 | Nguyen et al. ............. 463/16 |

* cited by examiner

*Primary Examiner* — Dwin M Craig
(74) *Attorney, Agent, or Firm* — Kenyon & Kenyon LLP

(57) ABSTRACT

An emulation system and emulation method for a no longer available microcontroller, having a supplyable microcontroller and emulation software able to be run thereon, and having an interpreter, the emulation software forming a software layer between the hardware of the available microcontroller and an operating software of the no longer available microcontroller, and the software being adapted in such a way that the hardware of the available microcontroller in conjunction with the additional emulation software behaves like the hardware of the no longer available microcontroller, and the interpreter is adapted in order to represent address, code and data information of the operating software of the no longer available microcontroller to functionally equivalent address, code and data information of the available microcontroller.

11 Claims, 2 Drawing Sheets

EMULATION SYSTEM AND METHOD FOR A NO LONGER AVAILABLE MICROCONTROLLER

RELATED APPLICATION INFORMATION

The present application claims priority to and the benefit of German patent application no. 10 2008 040 721.6, which was filed in Germany on Jul. 25, 2008, the disclosure of which is incorporated herein by reference.

FIELD OF THE INVENTION

The present invention relates to the field of control engineering and especially the microprocessors used in that field.

BACKGROUND INFORMATION

The stockpiling of components within the framework of future delivery obligations of control devices once the production has ceased entails financial risk. If not enough components are kept in stock prior to the discontinuation, then a costly post-production development looms, which ultimately must serve the entire variance in the field, however. If too many components are stockpiled, then the stock-keeping will cause expense, and components must also be scrapped once the post-production delivery obligation has expired. The most critical component in the stockpiling is the microcontroller, since it is the most complex, expensive and also the most risky component in a post-production control device development, especially the software. Moreover, for the micro controller, in particular, there still exists no (identical) second source.

One approach for solving this problem is to implement the software modules of the no longer available microcontroller in an FPGA (field-programmable gate array) and to mount it on an MCM (multi chip module) in the otherwise old packaging and mechanisms of the control devices. However, this presupposes that the software of the complete no longer available microcomputer is still in existence. When developing the microcontroller, this software would most likely have to be developed as well and ultimately be available in all supplied variants, development stages and derivations. Furthermore, the FPGA would have to a high number of gates. It must be assumed that a current FPGA is able to represent a one year old microcontroller in the first place.

Another approach is to network the hardware modules of the no longer available microcontroller from identical hardware modules of various available microcontrollers on an MCM, for example, and to mount it in the otherwise old packaging or mechanisms. This is a typical control device measure in the development of new microcontrollers, in which a development board is created from existing modules of microcontroller families of the particular manufacturer. For example, the first evaluation board (EVA) of the Golden Oak consisted of 2 microcontrollers, and the time processing unit (TPU) was used from one of them, and the other modules from the other. The communication of the separate modules must be implemented via the external bus of the microcontroller, which may entail performance losses as a result of the slow external communication. The software within the sense of a universal control device would therefore have to be modified or expanded by at least the external communication of the x microcontrollers.

Another approach suggests a complete replacement of the no longer available control device by a control device of the next control device generation, either with a compatible plug or with a plug adapter. It is assumed here, however, that a customer- or project-specific newer control device of the next control device generation exists. The additional functions produced as a result of the further development, or the additional software would have to be disabled. Moreover, it is assumed that no functional concept breaks or software changes or a functional re-design have taken place, if the outlay in connection with the change is to be restricted to the data application alone. Presumably, a software release would have to be used following the migration between the control device generations.

Given the many uncertainties, none of the previously known approaches therefore offers a reliable management of the stockpiling problem.

SUMMARY OF THE INVENTION

An advantage of the exemplary embodiments and/or exemplary methods of the present invention is that control devices are able to be supplied in a simple, rapid, reliable and cost-effective manner once their series production has come to an end.

This advantage is obtained by an emulation system for a no longer available microcontroller, which includes an available microcontroller and an emulation software able to run thereon, as well as an interpreter, the emulation software forming a software layer between the hardware of the available microcontroller and an operating software of the no longer supplyable microcontroller and being adapted in such a way that the hardware of the available microcontroller in conjunction with the additional emulation software behaves like the hardware of the no longer available microcontroller; the interpreter is adapted so as to image address, code and data information of the operating software of the no longer available microcontroller to functionally equivalent address, code and data information of the available microcontroller.

The exemplary embodiments and/or exemplary methods of the present invention assumes that the essential functions of a control device are defined by its central processing unit or microcontroller. On this basis, one essential aspect of the system is the emulation of the no longer available central processing unit or microcontroller by an available central processing unit or microcontroller. With the aid of the emulation software, which is running on the available microcontroller in addition, and the interpreter (binary code translator), the code (instructions and data), the memory accesses to registers or register banks, RAM (random access memory), flash etc., the interrupts and the periphery modules such as an ADC (analog digital converter), SIU (serial input/output), DIO (digital input/output) etc. are simulated or emulated in functionally and behaviorally equivalent manner.

The stockpiling of microcontrollers or even control devices at the end of production is thus superfluous. This holds true also for the usual stockpiling of a minimum number intended to prevent an excess of stockpiled microcontrollers or even control devices following the complete expiration of a delivery obligation. The expense is restricted only to the emulator and interpreter. In a quasi 1:1 representation of the code and runtime behavior, this saves further very expensive and risky adaptation developments in connection with the software, hardware and application or data input. Furthermore, the safeguarding of all delivered versions and variants that may arise, for example, in a currently typical migration from one control device generation to the next, is no longer necessary.

Old, existing and tried and tested programs for control devices as well as their application data sets may continue to be used in unchanged form.

Exemplary embodiments of the system according to the present invention are described herein.

In one exemplary embodiment, an adapter is provided to adapt a pinning of the available microcontroller to a footprint of the no longer available microcontroller. As a result, there is no need to modify the circuit board of the control device for the available controller, which allows it to be integrated in a simple and cost-effective manner.

The adapter may include timer components which are adapted to simulate a runtime behavior of the no longer available microcontroller. Delays, for example, thus do not have to be emulated by the software itself, which simplifies it.

The adapter may be developed as intermediate circuit board to be mounted between a circuit board and the available microcontroller. Such an intermediate circuit board and such a substrate require virtually no additional space in a control device. Required height compensations and discrete components are likewise accommodated thereon.

The emulation software may also include instruction sequences, which are adapted to emulate a runtime behavior of the no longer available microcontroller. Timer components on the adapter are therefore able to be replaced either completely or partially, especially when the adapter is implemented as MCM and has reached its maximum packaging density.

The system may be used for emulating a no longer available control device for a motor vehicle, since extensive delivery obligations exists precisely for these types of devices, both with regard to quantity and model life.

The advantage of the exemplary embodiments and/or exemplary methods of the present invention is also achieved by a method for emulating a no longer available microcontroller, in which an emulation software is made available and connected between the hardware of the available microcontroller and an operating software of the no longer available microcontroller, so that the hardware of the available microcontroller, in conjunction with the additional emulation software, behaves like the hardware of the no longer available microcontroller, and an interpreter is provided, which represents the address, code and data information of the operating software of the no longer available microcontroller to functionally equivalent address, code and data information of the available microcontroller.

Here, too, the essential aspect of the method is the emulation of the no longer available central processing unit or microcontroller by an available central processing unit or microcontroller. Since the method is essentially restricted to the provision of suitable emulation software and a corresponding interpreter, the method is particularly easy to implement and is also fast. Making use of the already tried and tested operating software of the no longer available controller makes the method both reliable and cost-effective.

Exemplary refinements of the method according to the present invention are also described herein.

Accordingly, in one advantageous development of the method, an adaptor is provided to adapt a pinning of the available microcontroller to a footprint of the no longer available microcontroller. This dispenses with the corresponding modification of the circuit board of the control device.

The emulation software and/or the timer components may emulate a runtime behavior of the no longer available microcontroller. This not only emulates the functionality of the original controller as such, but also its specific control and regulation behaviors, which result from its physical layout and the specific packaging.

To exclude excessive response times of the emulated controller, the address, code and data information may be interpreted offline and stored and first executed at the runtime of the emulation software. Thus, the interpreted information is first utilized when executing the method and is able to be processed more rapidly, so that a realistic controller behavior is able to be produced in all instances, which, at most, requires a delay but no additional acceleration.

Application data that set and/or modify the hardware characteristics of the no longer available microcontroller at the runtime, must possibly be adapted to the available controller as well. The emulation software may also convert the application data. This dispenses with a manual adaptation or an adaptation by an additionally required program.

The system and method according to the resent invention are explained in the following text with the aid of an exemplary embodiment with reference to the attached figures. Identical or equivalently acting components are provided with matching reference numerals.

DETAILED DESCRIPTION

Figure 1:
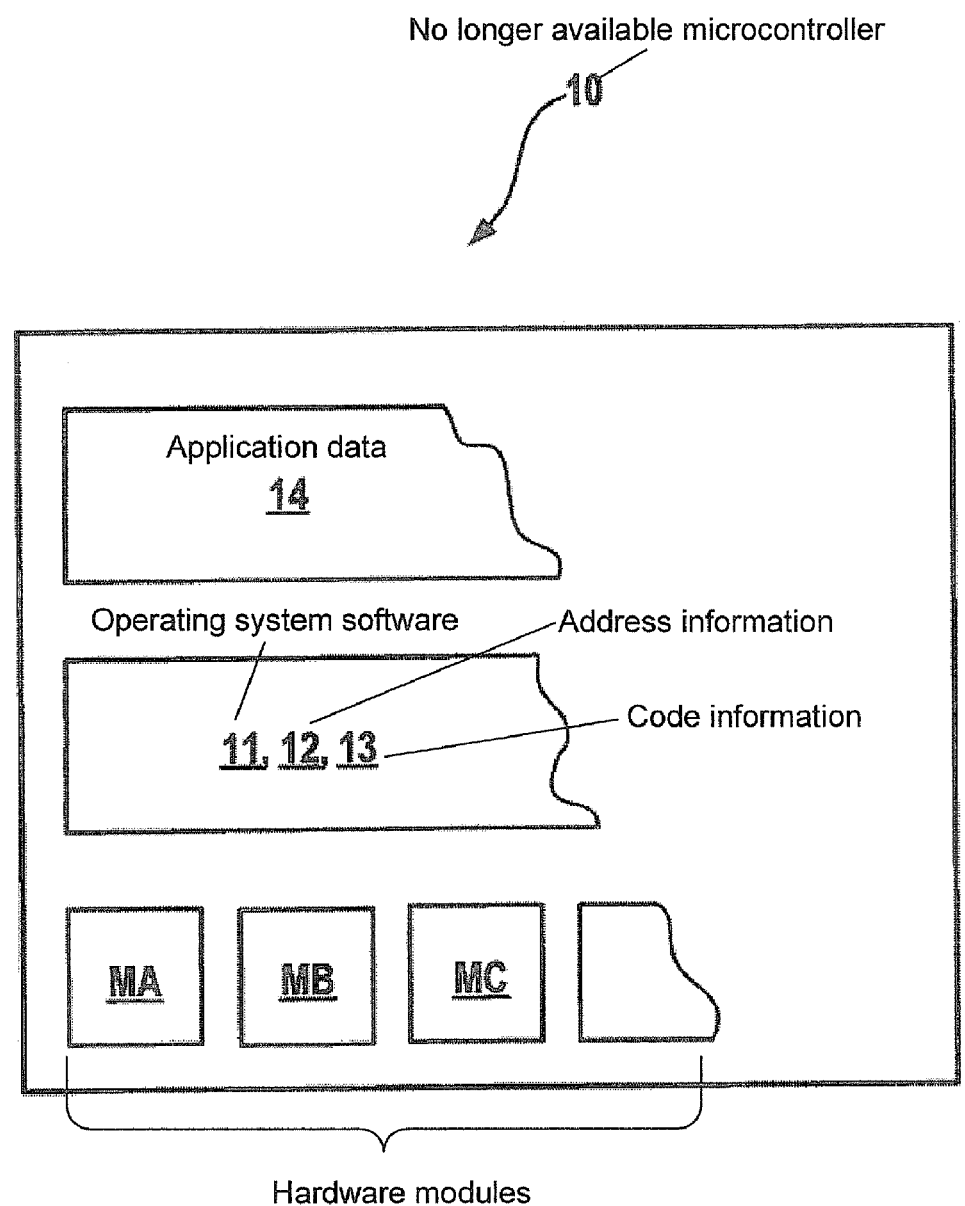
FIG. 1 shows a known model of logical layers of a no longer available microcontroller.

FIG. 1 shows a known model of logical layers of a no longer available microcontroller 10. Operating software 11, which includes address and code information 12, 13, is situated between data 14 and various hardware modules MA (module A) through MC (module C), e.g., a serial or parallel interface, a digital input/output etc.

Figure 2:
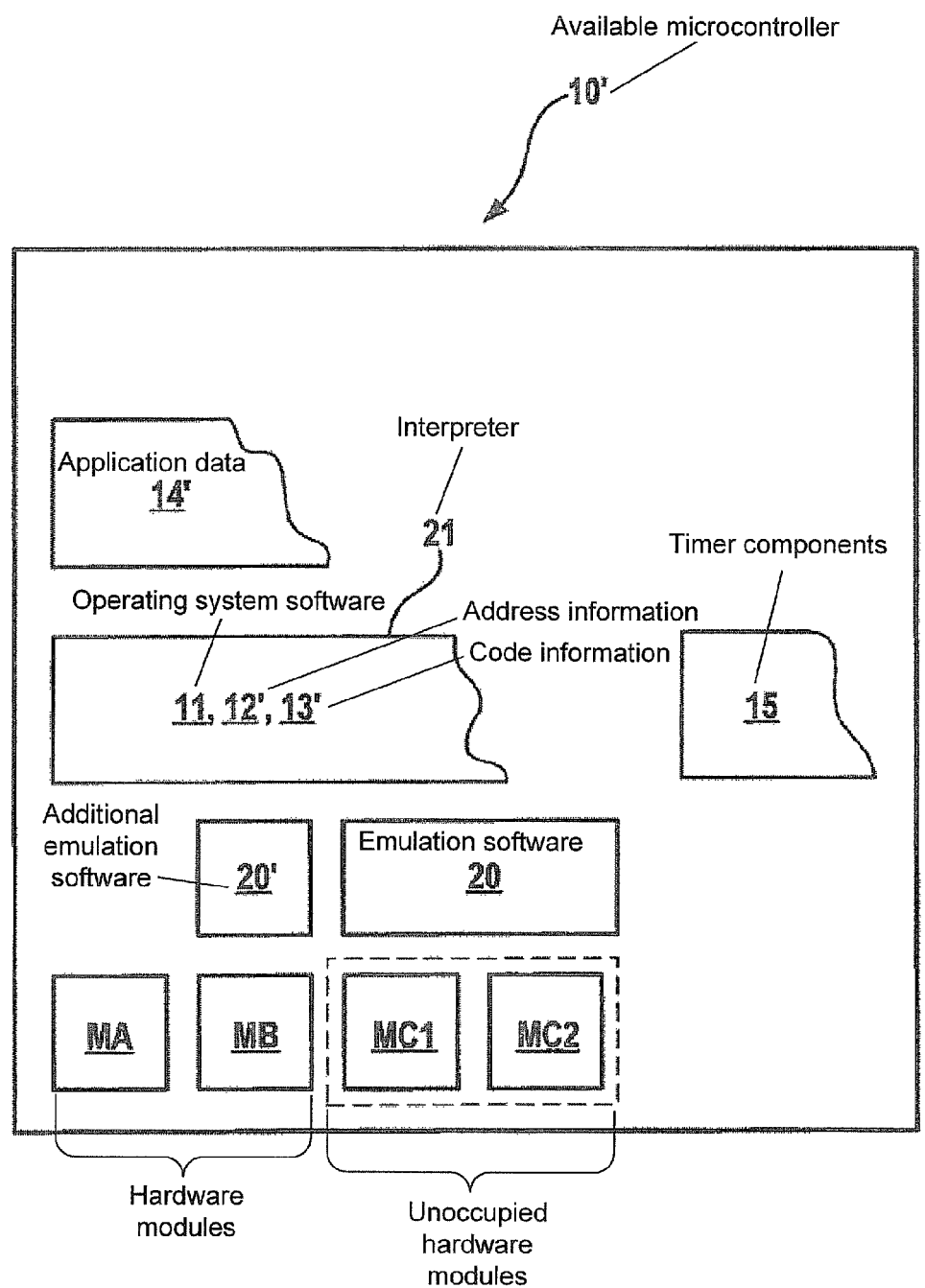
FIG. 2 shows a model of logical layers according to the present invention of an available microcontroller.

FIG. 2 shows a model of logical layers of an available microcontroller 10' according to the exemplary embodiments and/or exemplary methods of the present invention.

Emulation software 20 is placed as an additional software layer between the hardware of available microcontroller 10' and operating system software 11 of the no longer available microcontroller. The emulation software ensures that the hardware of available microcontroller 10' in conjunction with additional emulation software 20 behaves like the no longer available microcontroller hardware.

The memory model of the no longer available microcontroller 10 is determined from address and code information 12, 13 of software 11. Address and code information 12, 13 is also used to determine the configuration of hardware modules MA through MC of the no longer available microcontrollers 10. Moreover, the emulation software configures hardware modules MA through MC of available microcontroller 10'; in the process, it replaces missing modules and/or missing module characteristics by other as yet unoccupied hardware modules or unoccupied hardware module components MC1, MC2, and missing module characteristics and runtime adaptations by additional emulation software 20'. This additional software 20' must be executed in addition at the runtime during an access to the hardware modules. The translation rules may be specific to the hardware module. The translation may be implemented offline in order to spare runtime resources of available microcontroller 10' since it must process emulation software 20, 20' and an interpreter 21 in addition.

It is assumed that the continuing increase in capacity and resources in the further development of microcontrollers allow for the additional resource requirements that result from the additional emulation. In addition, the I/O hardware at the microcontroller or central processing unit must be available. Module MC, for which there are no or only partial hardware equivalents, must be simulated or emulated completely by other modules and emulation software 20, 20'. This basically corresponds to a complete new implementation development with the additional outlay in connection with a functionally and behaviorally equivalent representation, but without additional expense in connection with the configuration data and application data 14.

In addition, software 11 of no. longer available microcontroller 10 is interpreted on the basis of address, code and data information 12, 13, 14 and translated into an address, code and data information 12', 13', 14' able to be processed by available microcontroller 10'. Instructions of unavailable microcontroller 10 that have no representation in an individual instruction of available microcontroller 10' must be emulated by instruction sequences of available microcontroller 10'. Required data and format conversions must likewise be realized by instruction sequences so as to, for instance, emulate 16 bit processing by 32 bit processing, e.g., overflows, restrictions etc. The runtime behavior must be emulated by software delays and/or hardware timers 15.

Application data 14, which ultimately set or modify the hardware characteristics of no longer available microcontroller 10 at the runtime, must be converted as well.

This may be done by emulator 20, 20' itself, without causing additional application expense in the setting of data labels. An interpreter 21 reads the assembler instructions of controller 10' to be emulated at the runtime and interprets them in such a way that the same function is produced. As an alternative, addresses 12, codes 13 and/or data 14 of the no longer available microcontroller 10 are translated offline and stored and then executed at the runtime.

Such a simple and rapid, reliable and yet at the same time cost-effective emulation of no longer available microcontrollers is a comprehensive solution for the current stockpiling problem for entire control device generations and enables a speedy post-delivery at any time in the future.

What is claimed is:

1. An emulation system for a no longer available microcontroller, comprising:
   an available microcontroller and emulation software able to be run thereon;
   an emulation software forming a software layer between the hardware of an available microcontroller and an operating software of the no longer available microcontroller;
   wherein the emulation software:
      is adapted so that the hardware of the available microcontroller in conjunction with the additional emulation software behaves like the hardware of the no longer available microcontroller, and
      is adapted to replace hardware modules which exist in the no longer available microcontroller but are missing from the available microcontroller with unoccupied hardware modules existing in the available microcontroller;
   an interpreter adapted to represent address, code and data information of the operating software of the no longer available microcontroller to functionally equivalent address, code and data information of the available microcontroller.

2. The system of claim 1, further comprising:
   an adapter to adapt a pinning of the available microcontroller to a footprint of the no longer available microcontroller, so that the available microcontroller is physically connectable, via the adapter, to an external circuit board in the same manner as the no longer available microcontroller, to interact with the external circuit board in the same manner as the no longer available microcontroller.

3. The system of claim 2, wherein the adapter includes timer components that are configured to emulate a runtime behavior of the no longer available microcontroller.

4. The system of claim 2, wherein the adapter includes an intermediate circuit board for affixation between the external circuit board and the available microcontroller.

5. The system of claim 1, wherein the emulation software includes instruction sequences, which are adapted to emulate a runtime behavior of the no longer available microcontroller.

6. The system of claim 1, wherein the no longer available control device is of a motor vehicle.

7. A method for emulating a no longer available microcontroller, the method comprising:
   providing an emulation software and connecting it between hardware of an available microcontroller and an operating software of the no longer available microcontroller, so that the hardware of the available microcontroller in conjunction with additional emulation software behaves like the hardware of the no longer available microcontroller;
   configuring the emulation software so that it is adapted to replace hardware modules which exist in the no longer available microcontroller but are missing from the available microcontroller with unoccupied hardware modules existing in the available microcontroller; and
   providing an interpreter to represent address, code and data information of the operating software of the no longer available microcontroller to functionally equivalent address, code and data information of the available microcontroller.

8. The method of claim 7, further comprising:
   adapting a pinning of the available microcontroller to a footprint of the no longer available microcontroller using an adapter, so that the available microcontroller is physically connectable, via the adapter, to an external circuit board in the same manner as the no longer available microcontroller, to interact with the external circuit board in the same manner as the no longer available microcontroller.

9. The method of claim 7, wherein a runtime behavior of the no longer available microcontroller is emulated by at least one of the emulation software and timer components.

10. The method of claim 7, wherein the address, code and data information is interpreted offline and stored, and is first executed at the runtime of the emulation software.

11. The method of claim 7, wherein application data, which at least one of sets and modifies the hardware characteristics of the no longer available microcontroller at the runtime, are converted by the emulation software.

* * * * *